United States Patent [19]

Steigerwald

[11] Patent Number: 5,038,264
[45] Date of Patent: Aug. 6, 1991

[54] MULTIPLE-OUTPUT, SINGLE-ENDED, RESONANT POWER CONVERTER

[75] Inventor: Robert L. Steigerwald, Burnt Hills, N.Y.

[73] Assignee: General Electric Company, Schenectady, N.Y.

[21] Appl. No.: 535,687

[22] Filed: Jun. 11, 1990

[51] Int. Cl.⁵ .......................................... H02M 3/335
[52] U.S. Cl. ...................................... 363/21; 323/267
[58] Field of Search ...................... 363/18, 19, 20, 21; 323/267

[56] References Cited

U.S. PATENT DOCUMENTS

| | | | |
|---|---|---|---|
| 4,665,473 | 5/1987 | Onda et al. | 363/21 |
| 4,686,616 | 8/1987 | Williamson | 363/21 |
| 4,686,617 | 8/1987 | Colton | 363/21 |
| 4,845,605 | 7/1989 | Steigerwald | 363/21 |

FOREIGN PATENT DOCUMENTS 497567  3/1976  U.S.S.R. .

Primary Examiner—Peter S. Wong
Attorney, Agent, or Firm—Jill M. Breedlove; Marvin Snyder

[57] ABSTRACT

A single-ended, resonant power converter includes an input filter having at least one primary winding and multiple auxiliary, or secondary, windings. A regulated input DC voltage is transformed directly to the auxiliary windings. The voltages across the auxiliary windings are respectively rectified and filtered to provide multiple, auxiliary, regulated output voltages which are independent of the main output voltage and converter switching frequency.

8 Claims, 3 Drawing Sheets

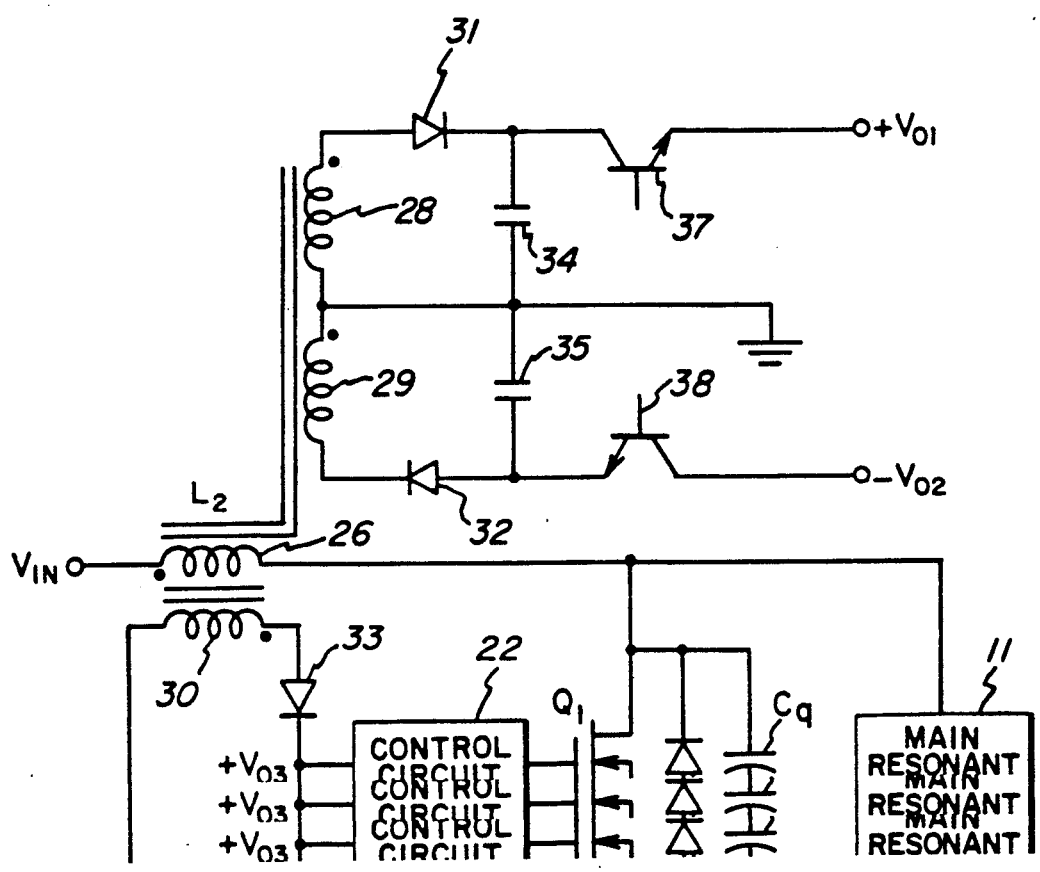

MULTIPLE-OUTPUT, SINGLE-ENDED, RESONANT POWER CONVERTER

FIELD OF THE INVENTION

The present invention relates generally to DC-to-DC power converters. More particularly, the present invention relates to a high-frequency, single-ended, resonant converter which provides a main output DC voltage, which may be constant or variable, and multiple auxiliary regulated output voltages.

BACKGROUND OF THE INVENTION

A single-ended, resonant power converter is described in Steigerwald U.S. Pat. No. 4,845,605, issued July 4, 1989, which patent is assigned to the instant assignee and is incorporated herein by reference. The converter of the Steigerwald patent is capable of operating at high frequencies, e.g. 1 MHz, and achieving high power densities. Furthermore, zero-voltage switching is realized by the Steigerwald converter, resulting in highly efficient converter operation.

One way to obtain multiple output voltages from a DC-to-DC power converter, such as the aforementioned single-ended, resonant converter, is to provide additional windings on the output transformer. In order to obtain regulated output voltages, however, a high degree of coupling among all transformer windings is essential. At high frequencies, tight coupling is difficult to achieve, resulting in output voltages which do not track closely. Moreover, if the main output winding is short-circuited, or if the main output winding is used to provide a variable voltage, then the auxiliary output voltages cannot be regulated because they track the main output voltage by virtue of the transformer coupling. Hence, it is desirable to provide a regulated power supply with multiple auxiliary output voltages that are independent of the main output voltage, which power converter is sufficiently simple in construction in order to be practicable for widespread applications.

OBJECTS OF THE INVENTION

Accordingly, an object of the present invention is to provide a new and improved single-ended, high-frequency, resonant power converter which is capable of providing multiple regulated output voltages.

Another object of the present invention is to provide a single-ended, resonant power converter which is capable of providing a variable main output voltage and multiple auxiliary regulated output voltages which are independent of the main output voltage.

Still another object of the present invention is to provide a regulated power supply which has multiple outputs and is simple in construction.

Yet another object of the present invention is to provide a single-ended, resonant power converter which is capable of providing multiple regulated, auxiliary output voltages independent of the converter switching frequency.

SUMMARY OF THE INVENTION

The foregoing and other objects of the present invention are achieved in a high-frequency, single-ended, resonant power converter capable of providing multiple regulated output voltages. The single-ended, resonant converter comprises a single, primary-side power switching device coupled to a resonant circuit which includes a capacitor, an inductor, and the parasitic capacitance of the power switching device. In accordance with the present invention, an input filter inductor has a primary winding and multiple auxiliary, or secondary, windings. When the power switching device is conducting, an input DC voltage is applied to the input inductor so that the voltage across the input inductor (which is substantially equal to the input DC voltage) is transformed directly to the auxiliary windings. The voltage across each auxiliary winding is rectified by a corresponding output diode. A filter capacitor is coupled to each output diode for maintaining the respective voltage applied thereto when the power switching device is turned off. As a result, the converter provides multiple auxiliary, regulated output voltages in addition to the main converter output DC voltage. Advantageously, these auxiliary output voltages are a function of the input voltage only and are not a function of the main output voltage of the converter. Hence, the converter provides the multiple regulated, auxiliary output voltages even if the main output voltage is variable. The converter of the present invention is particularly suitable for applications wherein the input voltage is fully or semi- regulated, such as distributed power applications, e.g. satellite systems, radar systems, and distributed computing systems, because the auxiliary output voltages, which are directly proportional to the input DC voltage, are approximately as well regulated as the input voltage.

The single-ended, resonant power converter of the present invention is advantageously highly efficient. First, zero-voltage switching of the power switching device is maintained by the resonant action of the main power circuit. In addition, power to the auxiliary converter outputs is not transferred through the resonant circuit elements.

As another advantage, the high frequency, single-ended, resonant power converter of the present invention is simple in construction. In particular, to obtain multiple, regulated auxiliary output voltages from a single-ended, resonant power converter, such as the Steigerwald converter hereinabove discussed, the only additional elements required are auxiliary secondary windings on the input inductor, and an output diode and filter capacitor per auxiliary output.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
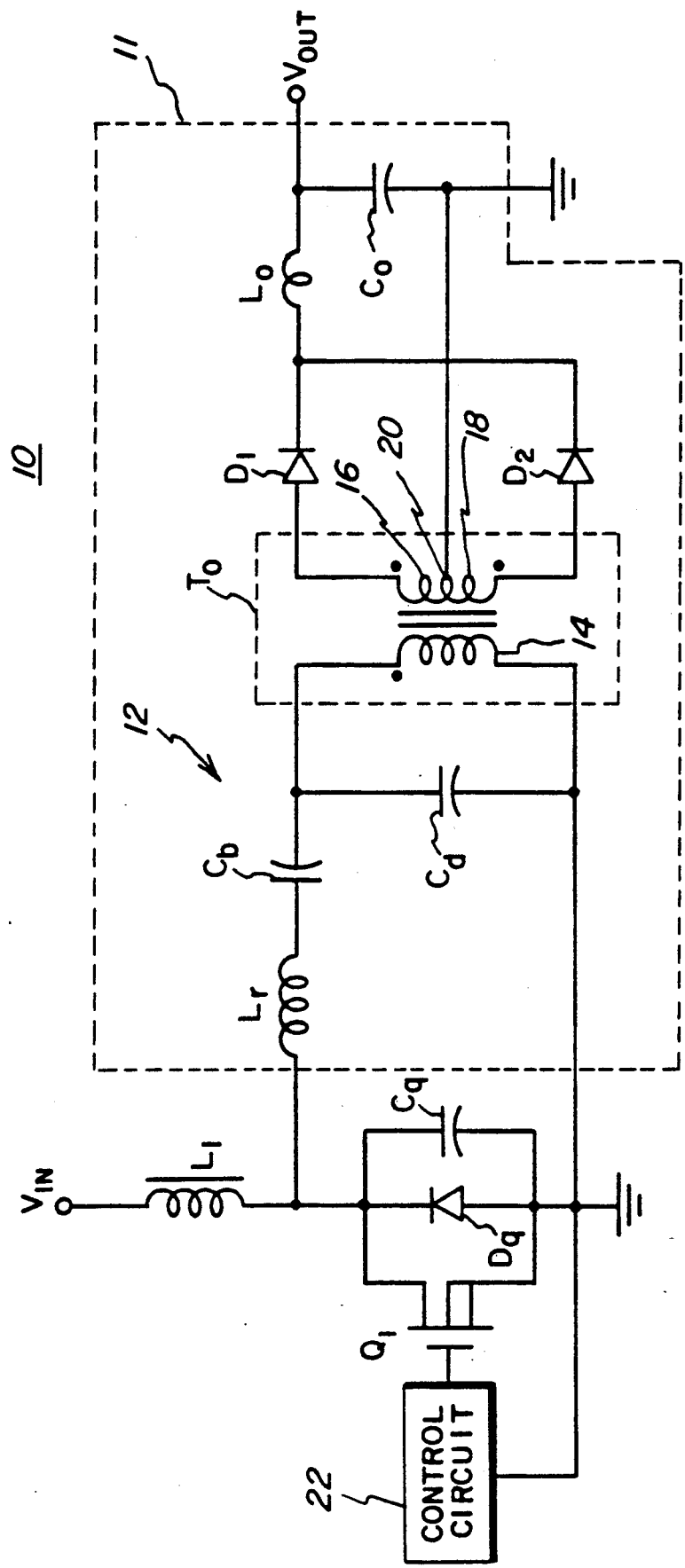
FIG. 1 is a schematic diagram of a single-ended resonant DC-to-DC power converter of the prior art.

FIG. 1 illustrates a single-ended, resonant, DC-to-DC power converter 10, such as that described in Steigerwald U.S. Pat. No. 4,845,605, cited hereinabove. An input filter inductor $L_1$ receives an input DC voltage $V_{IN}$. Inductor $L_1$ is coupled to a single power switching device $Q_1$. Power switching device $Q_1$ is illustrated in FIG. 1 as comprising a power MOSFET having a drain electrode connected to inductor $L_1$ and a source electrode connected to the circuit common. Switching device $Q_1$ also includes a parasitic output capacitance, represented by capacitance $C_q$, and a parasitic anti-parallel diode, represented by diode $D_q$. A main resonant power circuit 11, including a resonant circuit 12, is coupled in parallel with switching device $Q_1$ at the junction between inductor $L_1$ and switching device $Q_1$ to complete the converter. The resonant circuit 12 includes the series combination of a DC blocking capacitor $C_b$, a resonant inductor $L_r$, and another capacitor $C_d$. The resonant circuit further includes parasitic capacitance $C_q$ when switching device $Q_1$ is turned off. The primary winding 14 of an output transformer $T_o$ is connected in parallel with capacitor $C_d$. Secondary windings 16 and 18 are connected together at a center tap terminal 20, with the remaining end of each secondary winding 16 and 20 being connected, respectively, to the anode of a rectifying diode $D_1$ and $D_2$, respectively. The cathodes of diodes $D_1$ and $D_2$ are connected to each other and further to an input terminal of an output filter inductor $L_o$. The other terminal of output filter inductor $L_o$ is coupled to an output filter capacitor $C_o$, the other terminal of which is connected to the transformer center tap terminal. A control circuit 22, such as the one described in the Steigerwald patent, cited hereinabove, is coupled to the gate electrode of switching device $Q_1$ for controlling the conduction interval thereof in order to adjust and regulate the converter output voltage $V_{OUT}$.

Figure 2:
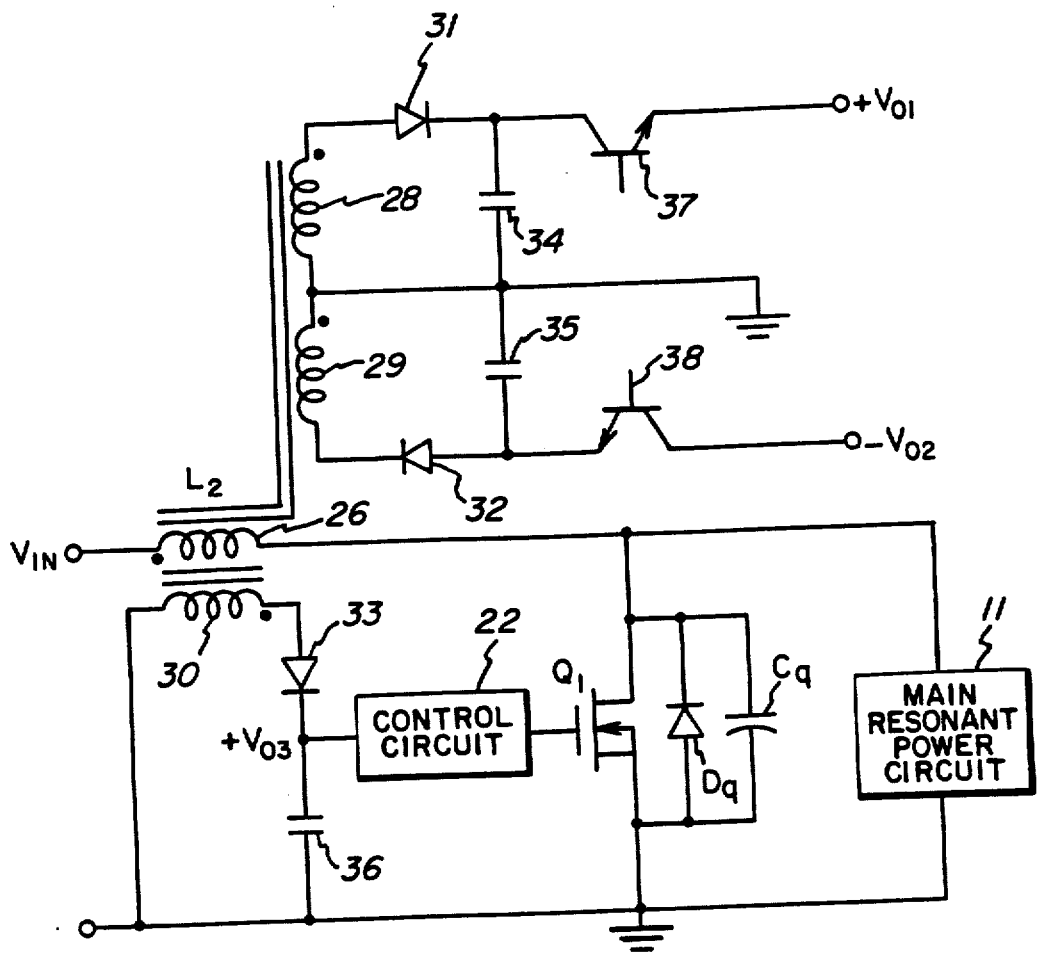
FIG. 2 is a schematic diagram of a multiple-output, single-ended, resonant DC-to-DC power converter in accordance with a preferred embodiment of the present invention.
Figure 3:
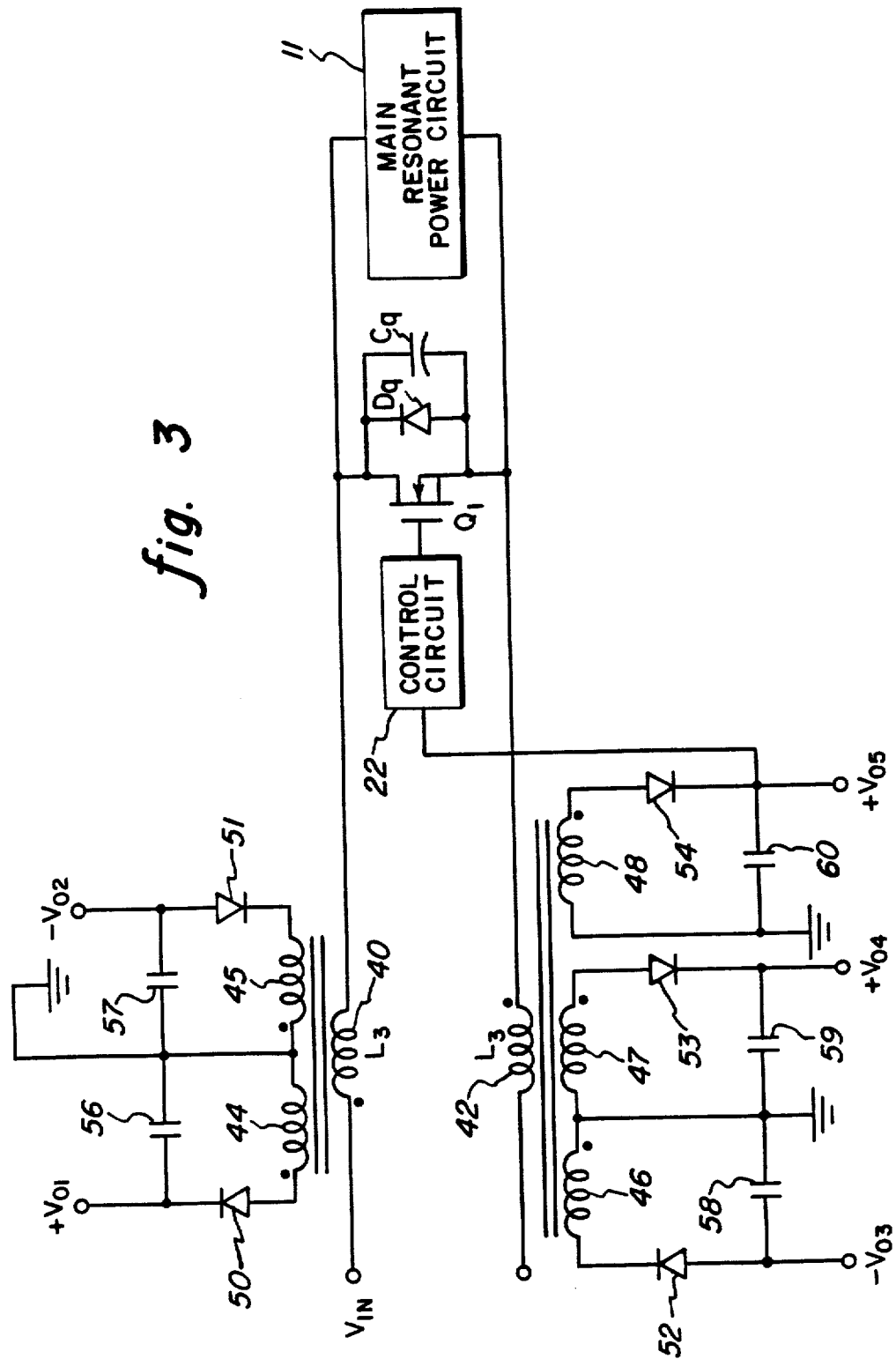

FIG. 2 illustrates the portion of a preferred embodiment of a multiple output, single-ended, resonant, DC-to-DC converter of the present invention. An input filter inductor $L_2$ includes a primary winding 26 and multiple auxiliary, or secondary, windings 28-30. For illustrative purposes, three secondary windings are shown in the embodiment of FIG. 2. Each secondary winding 28-30 is coupled in series with a diode 31-33, respectively, and a filter capacitor 34-36, respectively. Furthermore, to obtain an even higher degree of voltage regulation, a series pass regulator of a type well-known in the art may be employed to receive the respective output voltages at the junctions between the corresponding series combination of the diode and filter capacitor. For example, series pass regulators 37 and 38 are shown in FIG. 2 as being coupled to capacitors 34 and 35, respectively. Suitable series pass regulators may comprise semiconductor devices, such as the 7800 series of monolithic voltage regulators manufactured by Motorola, Inc., National Semiconductor Corporation, and others.

In operation, when switching device $Q_1$ is on, i.e. conducting, the DC input voltage $V_{IN}$ is applied directly to the input inductor $L_2$. Hence, this voltage is transformed directly to secondary windings 28-30 and rectified by diodes 31-33. As a result, the Output voltages $V_{O1}$-$V_{O3}$ are directly proportional to the input voltage $V_{IN}$. When $Q_1$ is turned off, filter capacitors 34-36 maintain the Output voltages $V_{O1}$-$V_{O3}$, respectively. Advantageously, therefore, the output voltages $V_{O1}$-$V_{O3}$ are independent of the switching frequency of device $Q_1$, which controls the main output voltage $V_{OUT}$ of the converter. Moreover, if desired, one of the output voltages $V_{O1}$-$V_{O3}$ may be coupled to control circuit 22 for providing regulated power thereto. For example, the output voltage $V_{O3}$ at the junction between diode 33 and capacitor 36 is shown as being coupled to control circuit 22 (FIG. 1).

As another advantage of the present invention, the output voltages $V_{O1}$-$V_{O3}$ are approximately as well regulated as the input voltage $V_{IN}$. Furthermore, as explained hereinabove, if an even higher degree of regulation of the output voltages $V_{O1}$-$V_{O3}$ is desired, then series pass regulators may be employed, such as regulators 37 and 38 illustrated in FIG. 2. Fortunately, the power dissipation of such series regulators is generally low due to the substantially regulated input voltage $V_{IN}$.

As still another advantage of the power converter of the present invention, the auxiliary output voltages $V_{O1}$-$V_{O3}$ are not functions of the main output voltage $V_{OUT}$, which is controlled by the switching frequency of switching device $Q_1$. In particular, the auxiliary output voltages $V_{O1}$-$V_{O3}$ are only dependent upon the input voltage $V_{IN}$. Hence, efficient, regulated auxiliary output voltages $V_{O1}$-$V_{O3}$ are maintained even if the main output voltage $V_{OUT}$ is variable.

Yet another advantage of the power converter of the present invention is high-efficiency operation. First of all, zero-voltage switching of switching device $Q_1$ is maintained due to the resonant action of resonant circuit 12 as described in Steigerwald U.S. Pat. No. 4,845,605, cited hereinabove. Secondly, auxiliary output power for providing the multiple auxiliary output voltages $V_{O1}$-$V_{O3}$ is not transferred through the resonant circuit elements.

Figure 3:
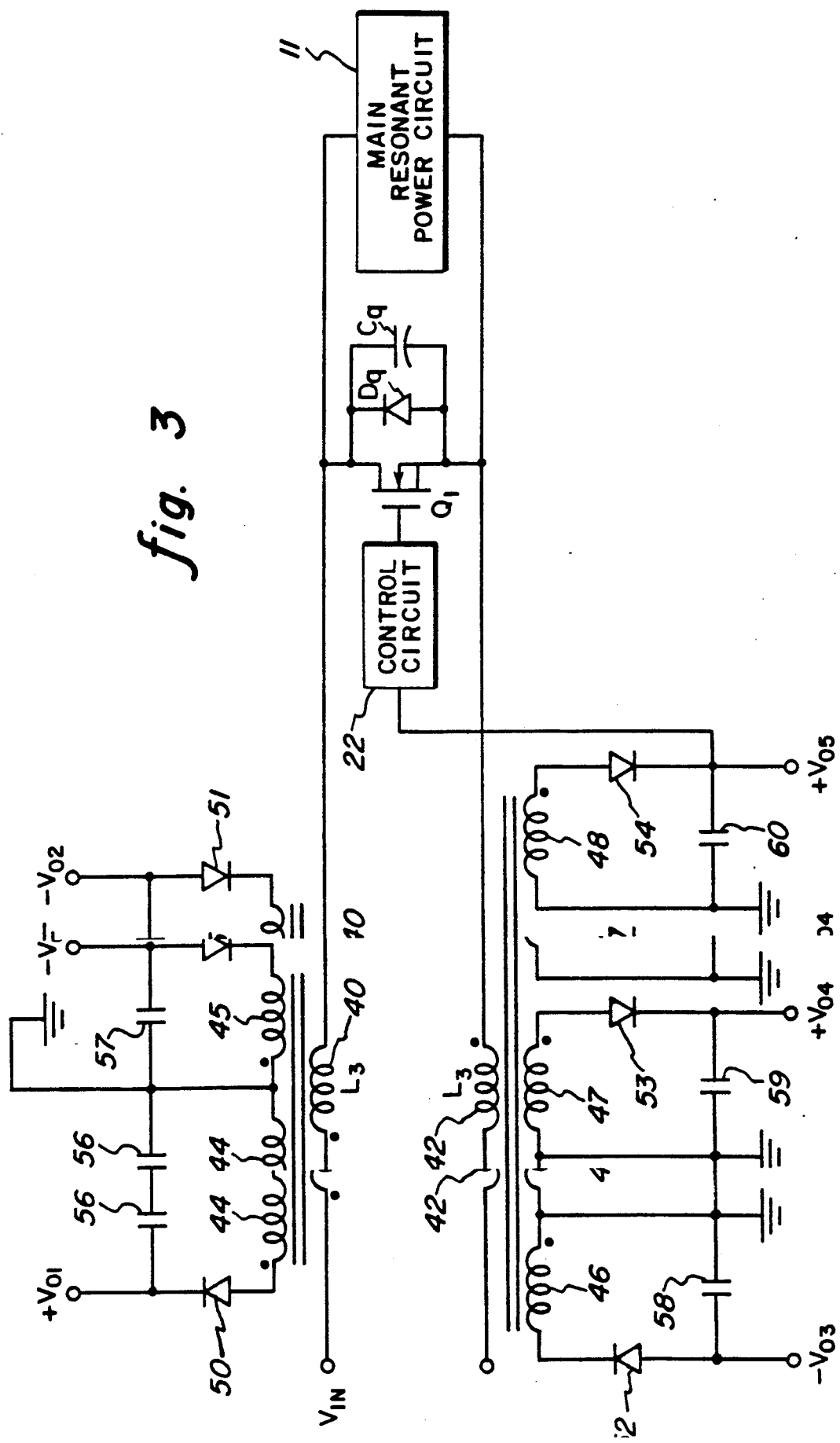
FIG. 3 is a schematic diagram of a multiple-output, single-ended, resonant DC-to-DC power converter in accordance with an alternative embodiment of the present invention.

FIG. 3 illustrates an alternative embodiment of the portion of a power converter according to the present invention wherein input inductor $L_3$ comprises a combination differential-mode/common-mode choke having two coupled primary windings 40 and 42. In such case, the input voltage $V_{IN}$ is ideally divided equally between the two primary windings 40 and 42 of choke $L_3$ when switching device $Q_1$ is turned on. (In practice, however, the voltage does not divide exactly equally due to slight differences in the inductances of windings 40 and 42). Choke $L_3$ further comprises multiple secondary windings, shown in FIG. 3 as secondary windings 44-48. Each secondary winding 44-48 is coupled in series with a rectifying diode 50-54, respectively, which in turn is coupled to a capacitor 56-60, respectively, for maintaining the auxiliary output voltages $V_{O1}$-$V_{O5}$ when switching device $Q_1$ is turned off. Advantageously, the auxiliary Output voltages $V_{O1}$-$V_{O5}$ are independent of the main output voltage $V_{OUT}$ and the converter switching frequency and are approximately as well regulated as the input voltage $V_{IN}$. Moreover, if desired, one of the multiple auxiliary output voltages, e.g. voltage $V_{O5}$, may be coupled to control circuit 22 (FIG. 2) for providing control power thereto.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A DC-to-DC power converter, comprising:
 an input filter inductor including a primary winding for receiving a substantially regulated input DC voltage;

a switching device coupled to said primary winding, said switching device having a parasitic capacitance coupled in parallel therewith;

control means for providing a control signal to turn on said switching device only when there is substantially zero voltage thereacross;

a resonant circuit for providing a first AC voltage at the output thereof, said resonant circuit including at least one reactive element in series with said parasitic capacitance during at least a portion of each cycle of said control signal;

output transformer means for receiving said first Ac voltage and transforming said first AC voltage to a second AC voltage;

first rectifying means for rectifying said second AC voltage to provide a main output DC voltage;

multiple secondary windings coupled to the primary winding of said input filter inductor for transforming said substantially regulated input DC voltage to respective secondary voltages;

a plurality of auxiliary rectifying means for rectifying said secondary voltages and respectively providing multiple, substantially regulated, output DC voltages, said multiple regulated output voltages being independent of said main output DC voltage; and an output capacitor coupled to each of said secondary windings for respectively maintaining the voltage thereacross when said switching device is turned off, said multiple regulated output voltages being independent of the switching frequency of said switching device.

2. The converter of claim 1 wherein said control means further comprises means for varying the switching frequency of said switching device to vary said main output DC voltage.

3. The converter of claim 1 wherein one of said auxiliary rectifying means is coupled to said control means for providing power thereto.

4. The converter of claim 1, further comprising a series pass regulator coupled to each said output capacitor for providing further regulation of each of said regulated output DC voltages, respectively.

5. A DC-to-DC power converter, comprising:
input choke means including two primary windings for receiving a substantially regulated input DC voltage and dividing said input DC voltage therebetween;

a switching device coupled to each of said primary windings, said switching device having a parasitic capacitance coupled in parallel therewith;

control means for providing a control signal to turn on said switching device only when there is substantially zero voltage thereacross;

a resonant circuit for providing a first AC voltage at the output thereof, said resonant circuit including at least one reactive element in series with said parasitic capacitance during at least a portion of each cycle of said control signal;

output transformer means for receiving said first AC voltage and transforming said first AC voltage to a second AC voltage;

first rectifying means for rectifying said second AC voltage to provide a main output DC voltage;

multiple secondary windings coupled to each of said primary windings for transforming said substantially regulated input DC voltage to respective secondary voltages;

a plurality of auxiliary rectifying means for rectifying said secondary voltages and respectively providing multiple, substantially regulated, output DC voltages, said multiple regulated output voltages being independent of said main output DC voltage; and an output capacitor coupled to each of said secondary windings for respectively maintaining the voltage thereacross when said switching device is turned off, said multiple regulated output voltages being independent of the switching frequency of said switching device.

6. The converter of claim 5 wherein said control means further comprises means for varying the switching frequency of said switching device to vary said main output DC voltage.

7. The converter of claim 5 wherein one of said auxiliary rectifying means is coupled to said control means for providing power thereto.

8. The converter of claim 5, further comprising a series pass regulator coupled to each said output capacitor for providing further regulation of each of said regulated output DC voltages, respectively.

* * * * *

UNITED STATES PATENT AND TRADEMARK OFFICE
CERTIFICATE OF CORRECTION

PATENT NO. : 5,038,264

DATED : August 6, 1991

INVENTOR(S) : ROBERT LOUIS STEIGERWALD

It is certified that error appears in the above-identified patent and that said Letters Patent is hereby corrected as shown below:

In the drawing:

Substitute the attached Figure 2 for Figure 2 of Sheet 2.

Substitute the attached Figure 3 for Figure 3 of Sheet 3.

Signed and Sealed this

Twenty-ninth Day of December, 1992

Attest:

DOUGLAS B. COMER

*Attesting Officer*   *Acting Commissioner of Patents and Trademarks*